United States Patent
Vehmas et al.

(10) Patent No.: US 8,997,521 B2
(45) Date of Patent: Apr. 7, 2015

(54) METHOD AND APPARATUS FOR SUPPORTING AND HEATING GLASS SHEETS ON A HOT GAS CUSHION

(75) Inventors: Jukka Vehmas, Tampere (FI); Mikko Rantala, Tampere (FI)

(73) Assignee: Glaston Services Ltd. Oy, Tampere (FI)

( * ) Notice: Subject to any disclaimer, the term of this patent is extended or adjusted under 35 U.S.C. 154(b) by 214 days.

(21) Appl. No.: 12/985,947

(22) Filed: Jan. 6, 2011

(65) Prior Publication Data

US 2011/0167871 A1 Jul. 14, 2011

(30) Foreign Application Priority Data

Jan. 11, 2010 (FI) ...................................... 20105015

(51) Int. Cl.
*C03B 23/035* (2006.01)
*C03B 35/24* (2006.01)
*C03B 27/04* (2006.01)
*C03B 27/048* (2006.01)
*C03B 29/12* (2006.01)

(52) U.S. Cl.
CPC ............... *C03B 35/24* (2013.01); *C03B 23/035* (2013.01); *C03B 27/0404* (2013.01); *C03B 27/0417* (2013.01); *C03B 27/048* (2013.01); *C03B 29/12* (2013.01)

(58) Field of Classification Search
CPC .... C03B 23/035; C03B 25/093; C03B 35/24; C03B 27/0404; C03B 27/0417; C03B 27/048; C03B 29/12; C03B 35/243; C03B 35/246
USPC ................................................ 65/25.2, 182.2
See application file for complete search history.

(56) References Cited

U.S. PATENT DOCUMENTS 3,374,078 A * 3/1968 Wright ......................... 65/182.2
3,809,542 A * 5/1974 Lythgoe et al. ................ 65/33.2
4,178,414 A 12/1979 Greenhalgh
(Continued)

FOREIGN PATENT DOCUMENTS

| EP | 0 000 268 A1 | 1/1979 |
|---|---|---|
| JP | 2000247663 A * | 9/2000 |
| WO | 2008/044706 A1 | 4/2008 |
| WO | 2009/028279 A1 | 3/2009 |

OTHER PUBLICATIONS

Translation of JP 2000-247663.*

(Continued)

*Primary Examiner* — Cynthia Szewczyk
(74) *Attorney, Agent, or Firm* — Buchanan Ingersoll & Rooney P.C.

(57) ABSTRACT

A method and apparatus for supporting and heating glass sheets for tempering or bending on a hot gas cushion. One edge of the glass is supported on transport rollers and the rotation axes of the rollers are transverse relative to the plane of the glass. The glass sheet is supported by means of gas pressure on a planar surface which has an angle of inclination of 2-20° relative to horizontal plane. The angle of inclination is sloping towards that edge of the glass which is supported by the transport rollers. Gas is expelled through the planar surface by way of gas outlet slots or holes. As the glass is moving, a gas is drawn or blown by fans from a certain part of the glass through the planar surface more than from the rest of the area by adjusting the rotating speed of the fans or by changing the suction pressure or delivery side pressure of the fans.

14 Claims, 4 Drawing Sheets

(56) References Cited

U.S. PATENT DOCUMENTS

| | | | |
|---|---|---|---|
| 4,204,845 A | 5/1980 | Shields et al. | |
| 6,053,011 A | 4/2000 | Lisec | |
| 6,192,711 B1 | 2/2001 | Lisec | |
| 6,470,711 B1 * | 10/2002 | Jarvinen et al. | 65/273 |
| 6,781,684 B1 | 8/2004 | Ekhoff | |
| 2003/0177790 A1 | 9/2003 | Langsdorf et al. | |
| 2005/0042070 A1 | 2/2005 | Ikehata et al. | |
| 2009/0155024 A1 | 6/2009 | Nüttgens et al. | |

OTHER PUBLICATIONS

Finnish Search Report for FI 20105015 dated Nov. 2, 2010.
Extended European Search Report dated May 11, 2011 issued by the European Patent Office in European Application No. 11150373.6 ((6 pgs).

* cited by examiner

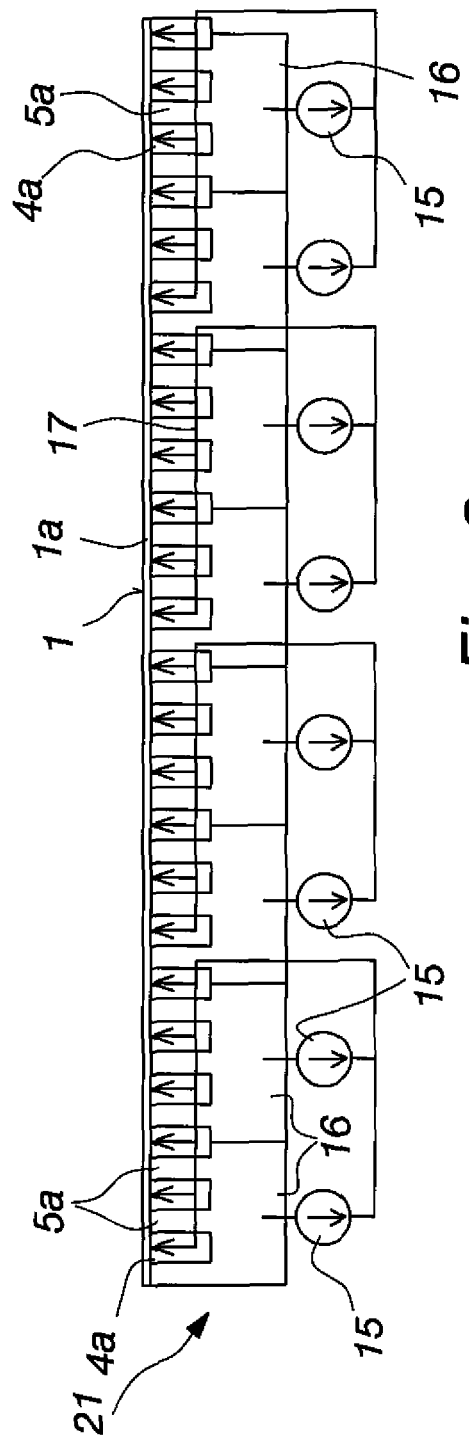

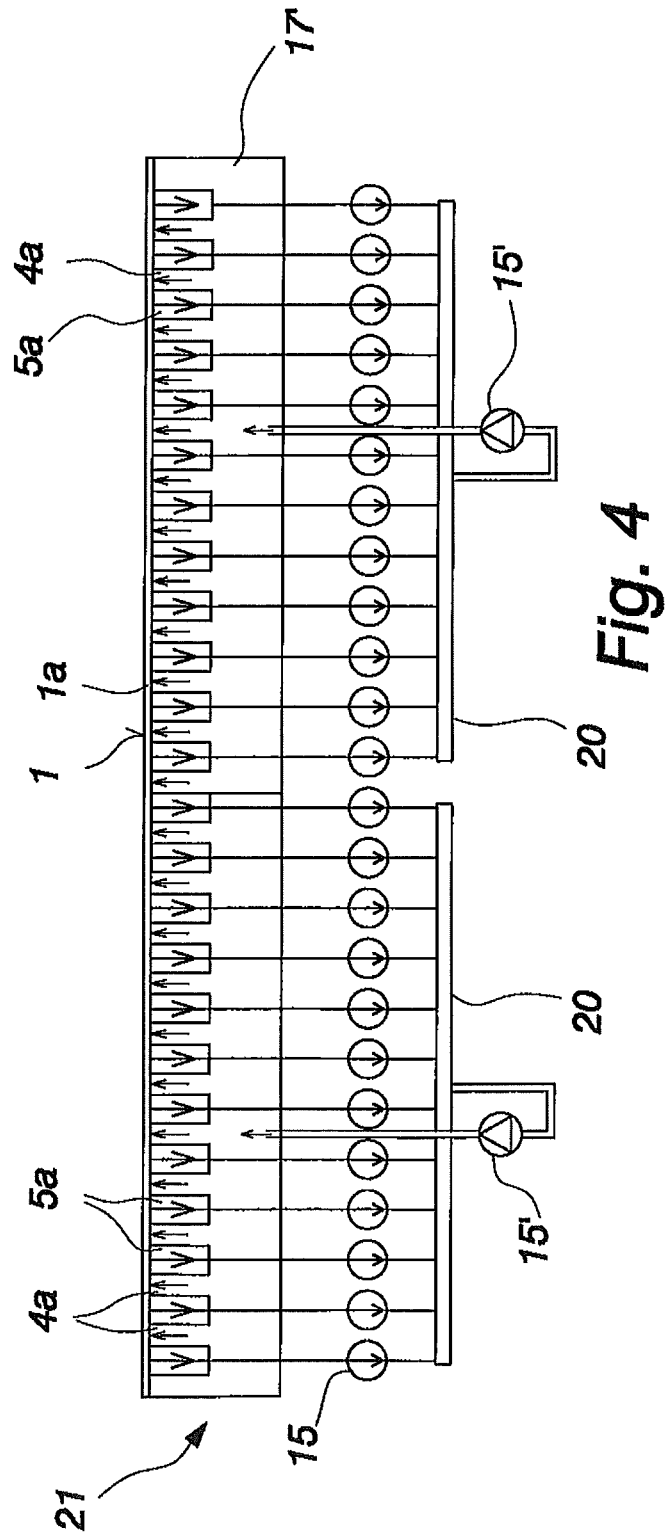

METHOD AND APPARATUS FOR SUPPORTING AND HEATING GLASS SHEETS ON A HOT GAS CUSHION

The invention relates to a method of supporting and heating glass sheets for tempering or bending on a hot gas cushion, in which method one edge of the glass is supported on transport rollers, the rotation axes of the rollers being transverse relative to the plane of the glass, and the glass sheet is supported by means of gas pressure on a planar surface which has an angle of inclination of 2-20° relative to horizontal plane, the angle of inclination sloping towards that edge of the glass which is supported by the transport rollers, and gas is expelled through the planar surface by way of gas outlet slots or holes.

The invention relates also to an apparatus for supporting and heating glass sheets for tempering or bending on a hot gas cushion, said apparatus comprising a glass sheet bearing platform provided with nozzle orifices and at its edge with transport rollers, the rotation axes of which are transverse relative to the bearing platform and upon which one edge of a glass sheet presently on the bearing platform is supportable, and the bearing platform has an angle of inclination of 2-20° relative to horizontal plane and the bearing platform includes gas outlet slots or holes, the glass sheet bearing being established by means of the pressure of a hot gas flowing along the bearing platform between the nozzle orifices and the gas outlet slots or holes.

This type of method and apparatus are known from the patent publication EP 0 000 268. This prior known method comprises blowing hot air from holes in a planar surface to the underside of glass. The blowing has a beneficial effect of generating between the glass and the planar surface a so-called gas cushion, which, mainly by virtue of static pressure, keeps the glass off the planar surface. The blast air serves at the same time as a glass heater. Furthermore, the planar surface is in a lightly inclined position towards a vertically installed roller set, the rotation of which can be used for conveying glass in a desired direction, for stopping it, possibly reversing its direction, etc. Heating is also applied to the topside of glass by convection principle.

Air bearing has its distinctive benefits: no contact marks, no corrugation resulting from roller support, and, in addition, the contact-induced lowering of underside surface temperatures has been minimized. An optimal temperature balance is retained.

However, one of the toughest challenges of air bearing is the uniformity of a load-bearing pressure between the edges and the central regions. The air finds an easy escape route from between the glass and the bearing platform in the immediate vicinity of glass edges, while the evacuation of air from the central region requires the construction of outlet channel systems. In particular, when dealing with thinner and larger glass sheets, this problem is pronounced and the glass has its central region arching off the planar surface more than the glass edge area. Thus, the glass is slightly convex upwards. At the final stage of heating, this easily results in a permanent deformation of the glass.

An object of the invention is to eliminate the above-mentioned problem and to find a solution for the uniform bearing of glass.

This object of the invention is achieved by means of characterizing method features presented in the appended claim 1. The object is also achieved by means of characterizing apparatus features presented in the appended claim 9.

The invention will now be described in more detail by way of an exemplary embodiment with reference to the accompanying drawings, in which FIG. 1 shows a bearing and heating section for an apparatus used for carrying out a method of the invention, i.e. a section present below a glass conveying platform, in a view from above;

FIG. 3 shows the apparatus of FIG. 1 schematically in a longitudinal section;

FIG. 4 shows another embodiment of the apparatus of FIG. 1 schematically in a longitudinal section.

Figure 2:
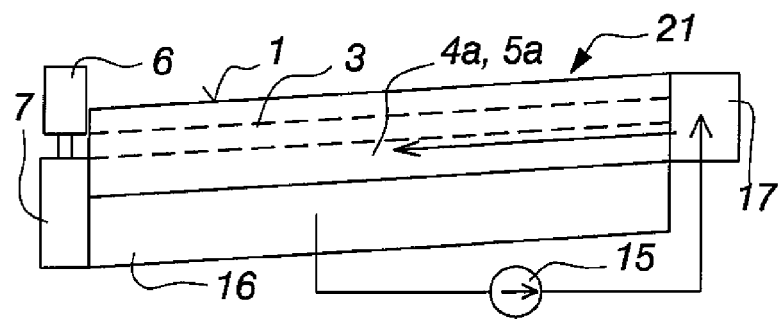
FIG. 2 shows the apparatus of FIG. 1 schematically in a cross-section.

The apparatus capable of implementing the method comprises a glass sheet bearing platform 1 provided with nozzle orifices 4 and having an angle of inclination of 2-20° relative to horizontal plane. The nozzle orifices 4 are provided as a pattern of blowholes with a perforation size of e.g. 3-5 mm. The perforation pattern 4 must have a high density, but the holes may not be aligned with each other in the glass conveying direction but, instead, offset from each other in order to avoid an anisotropic pattern. The bearing of glass is provided by the static pressure of a gas blown from the orifices 4, as well as to some extent by the dynamic pressure. Preferably, the proportion of static pressure is at least 80%, preferably not less than 90%.

The bearing platform 1 has its edge provided with transport rollers 6, the rotation axes of which are perpendicular to the bearing platform 1, i.e. substantially vertical. A glass sheet traveling on the bearing platform 1 has one of its edges supported upon the transport rollers 6. A drive mechanism 7 rotates the transport rollers 6 at a desired running speed. The glass is carried on the bearing platform 1 either just forward or in an oscillating manner back and forth, and the transfer rate is very low indeed, e.g. in the order of 40-200 mm/min.

In the embodiment of FIGS. 2 and 3, the bearing platform 1 includes a platform surface 1a which is e.g. a ceramic slab, below which are successively in the glass passing direction a number of pressure enclosures 4a, into which is supplied a hot gas by the pressure of fans 15. The enclosures 4a are provided with heating resistances 3 for heating the gas to a desired temperature, typically in the range of 600-650° C. In the present exemplary embodiment, the pressure enclosures 4a are interconnected by dispensing ducts 17 of a desired length to establish pressure zones of a desired size, comprising a desired number of pressure enclosures. Each pressure zone has its dispensing duct 17 connected to the delivery side of one or more fans 15.

The gas flow discharging from the nozzle orifices 4 is directed substantially perpendicularly to the plane of the glass and makes a sharp 90° deflection into a gap between the planar surface 1a and the glass. The amount of gas discharging from the nozzle orifices is used for adjusting the static pressure so as to establish a gap of less than 4 mm, preferably less than 2 mm, most preferably less than 1 mm, between the platform surface 1a and the glass. The gas expels through outlet holes or slots 5 arranged in the vicinity of the blowholes into horizontal outlet channels 5a present underneath the planar surface 1a. The present exemplary embodiment comprises a plurality of outlet channels 5a connected to a joint outlet chamber 16. Each outlet chamber 16 is connected to the suction channel of a respective fan 15. The fans 15 are arranged successively in the glass sheet traveling direction and can be used for drawing or blowing mutually adjustable amounts of gas to various parts of the glass sheet. The pitch of the pressure enclosures 4a and the suction channels 5a, and the connection thereof with air circulation performed by the fans 15, can be implemented in many variations. In extreme cases there may only be one common suction chamber 16, which houses several pressure enclosures 4a, or one common pressure enclosure, which houses several suction chambers 5a/16. What is essential is that, as the glass is moving, a gas can be drawn or blown by the fans 15 from a certain part of the glass through the platform surface 1a more than from the rest of the glass area by adjusting the rotating speed of the fans 15 or by changing the suction pressure or delivery side pressure of the fans 15. When the suction pressure or delivery side pressure of one or more fans is adjusted by adjusting the rotating speed of the fans, it is preferred that other fans be used to compensate partially or entirely for the adjustment-induced change in the air circulation mass flow. The bearing platform 1 and the pressure enclosures and suction chambers 4a/16 make up jointly a hollow-core slab 21, wherein the pressure enclosures 4a can be inside the suction chambers 16 or vice versa (as explained later with reference to FIG. 4).

The pressure and suction zones, which can be established on the planar surface 1a and which are adjustable relative to each other, can be equal or unequal in size. Adjustment can be conducted in a fan-specific manner and, in addition, also in an enclosure-specific manner in case it is desirable to divide the fan-specific adjustment regions into still smaller adjustment areas by means of regulation valves or flow controllers. The employed gas is typically air. The uniform bearing of glass is achieved by regulating the intake air in such a way that air is drawn in as much as possible from the region in which the glass would become most intensively curved, while air is drawn in as little as possible or not at all from the end sections of the glass. Alternatively or additionally, the consistently uniform bearing is achieved by blowing more air to the end sections of glass than to its central region. The rotating speed of fans is regulated e.g. by inverter control, which adjusts the speeds of fans as the glass moves forward, whereby the bearing equalizer control complies with the movement of glass. The controlled operation of fans is possible as the control system is always privy to the location and size of the glass.

Figure 1:
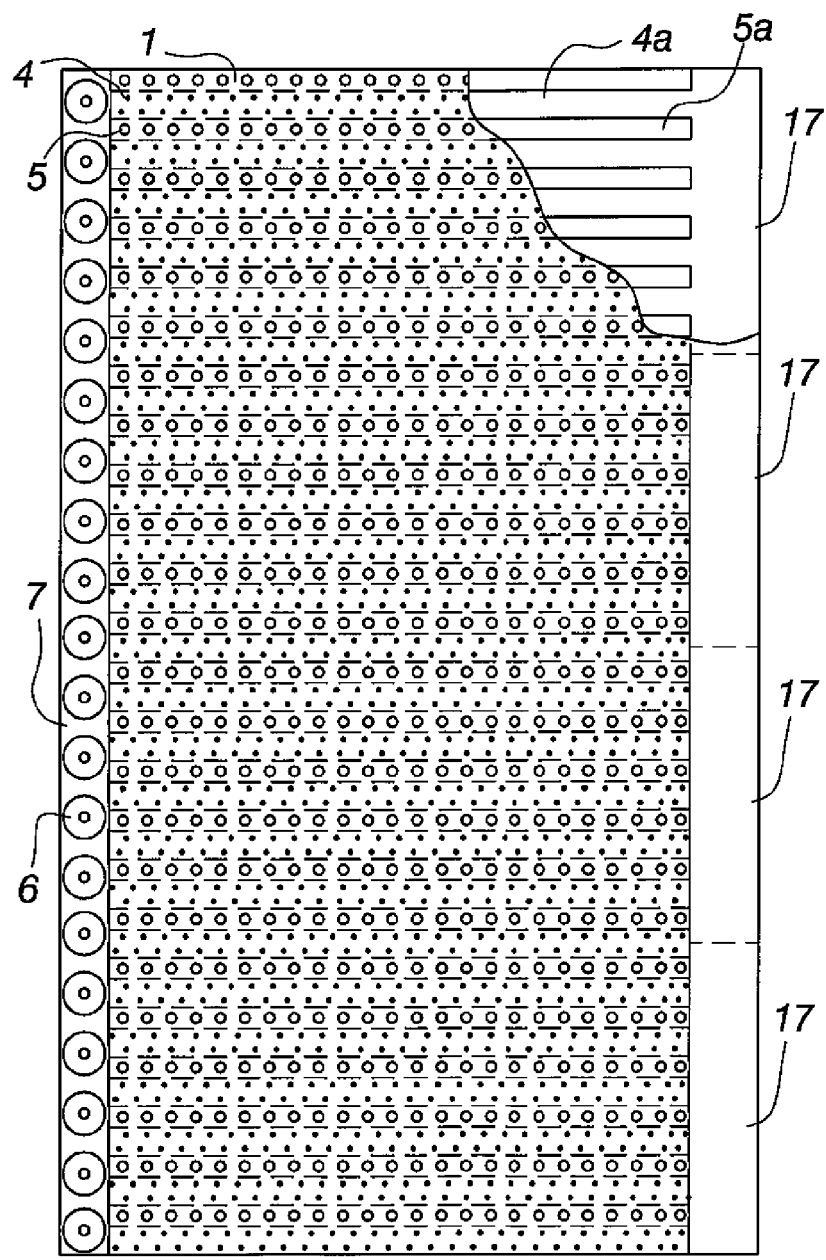

The embodiment of FIG. 4 differs from the embodiment of FIGS. 2 and 3 mainly in that the gas flow direction is changed and the mutual locations of nozzle orifices 4 and outlet holes or slots 5 in FIG. 1 are changed respectively. There is no joint outlet chamber 16 but each outlet enclosure or box 5a is connected to a suction fan 15. Several suction fans 15 have their pressure sides connected to a collecting tube 20, from which the gas is sucked by a pressure fan 15' having its pressure side connected to a pressure distribution chamber 17'. Preferably there are two or more successive pressure distribution chambers 17' each having its own pressure fan 15' and being combined with pressure channels 4a defined between outlet enclosures or boxes 5a. The embodiment of FIG. 4 has the advantage that suction and pressure can be regulated by using different fans 15 and 15', respectively, whereby the regulation is more effective. Particularly, different suction effects at different areas of the glass sheet can be caused effectively without affecting the pressure supporting the glass sheet. Two, three or four outlet enclosures or boxes 5a can have a common suction fan 15. The outlet enclosures or boxes 5a (suction boxes) can also be longitudinally divided into compartments having different suction effects in order to have widthwise profiling of suction effects. The different suction effects can be caused by using either separate fans 15 or regulation valves in channels combining the compartments to a common suction fan 15.

Figure 5:
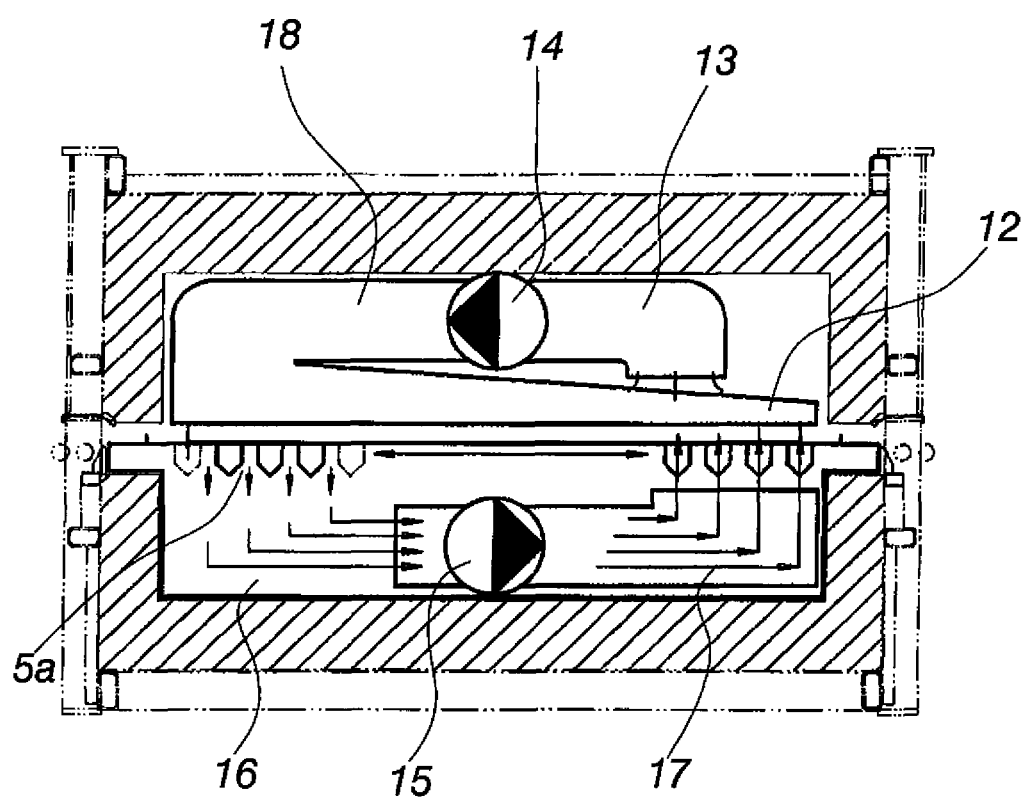
FIG. 5 shows schematically in a longitudinal section an entire furnace for applying the invention.

FIG. 5 depicts a stripped-down layout with just one fan 15, although, in practice, there are a number of fans 15 in succession as shown in FIGS. 3 and 4. On the other hand, the overhead convection heating of a glass sheet can be conducted with conventional convection heating equipment, including nozzle enclosures 12, which are elongated in the conveying direction and several of which are in a side by side relationship, one or more suction channels 13 capable of drawing in the return air which discharges from between the enclosures 12 to an upper part of the furnace, and one or more fans 14 capable of pressing the convection air through one or more pressure channels 18 into the nozzle enclosures 12. Heating resistances (not shown) are in a conventional manner located either between or inside the enclosures 12 or anywhere along the convection air circulation route. Operation of the fans 15 and 14 can be arranged by means of motors external of the furnace with drive shafts extended through the heat insulation.

The invention claimed is:

1. A method of supporting and heating glass sheets for tempering or bending on a hot gas cushion comprising: supporting one edge of the glass on transport rollers, the rotation axes of the rollers being transverse relative to the plane of the glass, and the glass sheet is supported by means of gas pressure on a planar surface which has an angle of inclination of 2-20° relative to horizontal plane, the angle of inclination sloping towards that edge of the glass which is supported by the transport rollers, and a gas is expelled through the planar surface by way of gas outlet slots or holes to define a suction zone extending across substantially an entire width of the glass sheet, and, as the glass is moving, causing different suction effects at a first area and a second area of the glass sheet by drawing the gas with fans from a first area of the glass sheet through the planar surface more than from a second area by adjusting the mutual rotating speeds of the fans or by changing the mutual suction pressures of the fans.

2. A method according to claim 1, wherein as the glass is moving, a gas is blown by fans to the first area of the glass sheet through the planar surface more than to the second area of the glass sheet by adjusting the rotating speed of the fans or by changing the delivery side pressure of the fans.

3. A method according to claim 2, wherein the fans, arranged successively with respect to the traveling direction of a glass sheet, are used for drawing or blowing mutually adjustable amounts of gas to various regions of the glass sheet.

4. A method according to claim 3, wherein when the suction pressure and/or delivery side pressure of one or more fans is adjusted by adjusting the rotating speed of the fans, other fans are used to compensate partially or entirely for the adjustment-induced change in the air circulation mass flow.

5. A method according to claim 1, wherein the glass sheet is supported by means of a static gas pressure, and the static pressure is generated by a hot gas flowing along the planar surface between nozzle orifices opening onto the planar surface and air outlet slots or holes opening onto the planar surface.

6. A method according to claim 1, wherein the amount of gas discharging from the nozzle orifices is used for adjusting the static pressure in such a way that the gap between the planar surface and the glass is less than 1 mm.

7. A method according to claim 1, wherein from the gas outlet slots or holes extending through the planar surface, the gas is carried along outlet channels, which are present underneath the planar surface into suction inlets of the fans, the outlet channels being larger than the outlet slots or holes.

8. A method according to claim 1, wherein the gas flow, which generates a static bearing pressure, is produced from the orifices of pressure enclosures in a ceramic hollow-core slab, and the gas is circulated through an interior of the ceramic hollow-core slab, and that inside the pressure enclosures are heating resistances for heating the circulating gas.

9. A method according to claim 1, wherein the amount of gas discharging from the nozzle orifices is used for adjusting the static pressure in such a way that the gap between the planar surface and the glass is less than 4 mm.

10. A method according to claim 1, wherein the amount of gas discharging from the nozzle orifices is used for adjusting the static pressure in such a way that the gap between the planar surface and the glass is less than 2 mm.

11. An apparatus for supporting and heating glass sheets for tempering or bending on a hot gas cushion, said apparatus comprising a glass sheet bearing platform provided with nozzle orifices and at its edge with transport rollers, the rotation axes of which are transverse relative to the bearing platform and upon which one edge of a glass sheet presently on the bearing platform is supportable, and the bearing platform has an angle of inclination of 2-20° relative to horizontal plane and the bearing platform includes gas outlet slots or holes, the glass sheet bearing being established by means of the pressure of a hot gas flowing along the bearing platform between the nozzle orifices and the gas outlet slots or holes, wherein the gas outlet slots or holes flare out below a planar surface of the bearing platform into larger outlet channels, several of which are arranged successively in the glass conveying direction, the outlet channels being connected to the suction inlets of at least two fans to define a suction zone extending across substantially an entire width of the glass sheet, the suction pressures or the rotating speeds of the fans being adapted to be adjustable with respect to each other for causing different suction effects at different areas of the glass sheet.

12. An apparatus according to claim 11, wherein the bearing platform is the surface of a ceramic hollow-core slab, and that inside the hollow-core slab are pressure chambers, containing heating resistances by which the gas to be circulated through an interior of the hollow-core slab is adapted to be heated.

13. An apparatus according to claim 11, wherein several fans are arranged successively in the glass traveling direction.

14. An apparatus according to claim 11, wherein above the platform surface are blowing enclosures, which extend in the glass conveying direction and several of which are in a side by side relationship.

* * * * *